United States Patent

Ozeki et al.

[11] Patent Number: 5,198,617
[45] Date of Patent: Mar. 30, 1993

[54] DUCT LAYING FIXTURE FOR BELLOWS TYPE CABLE DUCT

[75] Inventors: Shotaro Ozeki; Masakazu Kawanabe; Keiji Imamura; Makoto Nakayama, all of Fukuoka, Japan

[73] Assignees: Saito Denki Sangyo Co., Ltd.; Fukuoka Kurosu Kogyo Co., Ltd., both of Fukuoka, Japan

[21] Appl. No.: 761,725

[22] Filed: Sep. 18, 1991

[30] Foreign Application Priority Data

Sep. 21, 1990 [JP] Japan .................. 2-253924

[51] Int. Cl.[5] .................. H02G 3/22
[52] U.S. Cl. .................. 174/65 R; 174/37
[58] Field of Search .................. 174/37, 65 R, 151; 248/56

[56] References Cited

U.S. PATENT DOCUMENTS

| | | | |
|---|---|---|---|
| 3,263,378 | 8/1966 | Dorris | 174/37 X |
| 4,302,035 | 11/1981 | Ochwat | 174/65 R X |
| 4,475,594 | 10/1984 | Drake et al. | 166/294 |
| 4,616,105 | 10/1986 | Borsh | 174/65 R |
| 4,677,253 | 6/1987 | Blomqvist | 174/65 R X |

Primary Examiner—Leo P. Picard
Assistant Examiner—David Tone
Attorney, Agent, or Firm—Morrison Law Firm

[57] ABSTRACT

A distributing box for laying a cable duct in the construction field in is sealed, after laying the cable duct, with mortar and then buried in the ground. Accordingly, setting up the distributing box is simplified. Also, underground water must not permeate the distributing box. In the present invention, therefore, a duct laying fixture is constructed includes a box-shaped barrel of a water-expansible elastic material attached to the bellows type cable duct, and a water-expansible sheet which is stuck on the outer surface of the barrel. The barrel includes a duct mounting port in which the bellows type cable duct is mounted. Ribs are formed on the peripheral wall surface of the port to come into close contact with the outer peripheral surface of the bellows type cable duct. A slit permits spreading the barrel. The sheet is stuck on the outer surface of the barrel after the duct has been passed by spreading the barrel.

3 Claims, 3 Drawing Sheets

DUCT LAYING FIXTURE FOR BELLOWS TYPE CABLE DUCT

BACKGROUND OF THE INVENTION

1. Field of the Invention

The present invention relates to a duct laying fixture for a bellows type cable duct. More particularly, it relates to means for laying the bellows type cable duct into a distributing box which is installed for burying communication cables, or power cables in the ground.

2. Description of the Prior Art A distributing box in which underground cables are disposed, is usually made of concrete. In burying the distributing box in the ground, an insertion hole is provided in the side wall of this box by an electric drill or the like, and a cable duct is inserted into the insertion hole.

When underground water permeates the distributing box, the cables are liable to corrode, and hence, the insertion hole must be completely sealed up. For this purpose, it has heretofore been common practice that, after the insertion and fixation of the cable duct in the insertion hole of the distributing box, the interspaces between the cable duct and the circumference of the insertion hole are coated and filled up with mortar.

This expedient in the prior art has the problem that, since the mortar must be prepared on the job site the duct laying work is very troublesome. Another problem is that the state of finish is prone to disperse depending upon the degree of skill in the duct laying job. Furthermore, the mortar develops crack due to drying and shrinkage thereof, temperature variations, and vibrations from to passing vehicles. Underground water is thus able to invade the distributing box through the cracks. The above problems occur particularly in cable duct of the bellows type.

OBJECTS AND SUMMARY OF THE INVENTION

It is accordingly an object of the present invention to provide means for laying a bellows type cable duct, which permits the bellows type cable duct to be easily laid into a distributing box and which exhibits excellent watertightness.

In order to accomplish the object, the present invention constructs a duct laying fixture (1) for a bellows type cable duct (4), comprising a box-shaped barrel (2) which is made of a water-expansible elastic material and which is attached to the bellows type cable duct (4) so as to embrace this duct (4), and a water expansible sheet (3) which is stuck on the outer surface of the barrel (2). Herein, the barrel (2) includes a duct mounting port (5) in which the bellows type cable duct (4) is mounted, ribs (8) which are formed on the peripheral wall surface of the duct mounting port (5) and which come into close contact with the outer peripheral surface of the cable duct (4), and a barrel spreading slit (7) which is formed so as to extend from one side surface of the barrel (2) to the duct mounting port (5).

According to the above construction, the barrel (2) is spread at the slit (7) and is attached to the bellows type cable duct (4), whereupon the water-expansible sheet (3) is stuck on the outer surface of the resultant barrel (2). Subsequently, the resultant duct laying fixture (1) is received in an insertion hole (11) formed in the side wall of a distributing box (10) which is to be buried in the ground. Thus, the duct laying fixture (1) is easily assembled. In the assembled state of the fixture (1), underground water which is about to permeate the distributing box (10) through the interior of the barrel (2) or along the outer surface of the barrel (2) is absorbed by the barrel (2) or the water-expansible sheet (3). In this regard, as the barrel (2) or the sheet (3) absorbs more water, it swells to increase its watertightness more, so that the permeation of the underground water is hindered more reliably. Moreover, since the ribs (8) of the duct mounting port (5) lie in firm engagement with the outer surface of the bellows type cable duct (4), a satisfactory water-blocking force and a duct mounting force are attained, and the bellows type cable duct (4) is prevented from falling off due to the vibrations ascribable to passing vehicles, etc.

BRIEF DESCRIPTION OF THE DRAWINGS

The drawings illustrate an embodiment of the present invention, in which.

DESCRIPTION OF THE PREFERRED EMBODIMENT

An embodiment of the present invention will be described with reference to the drawings.

Figure 2:
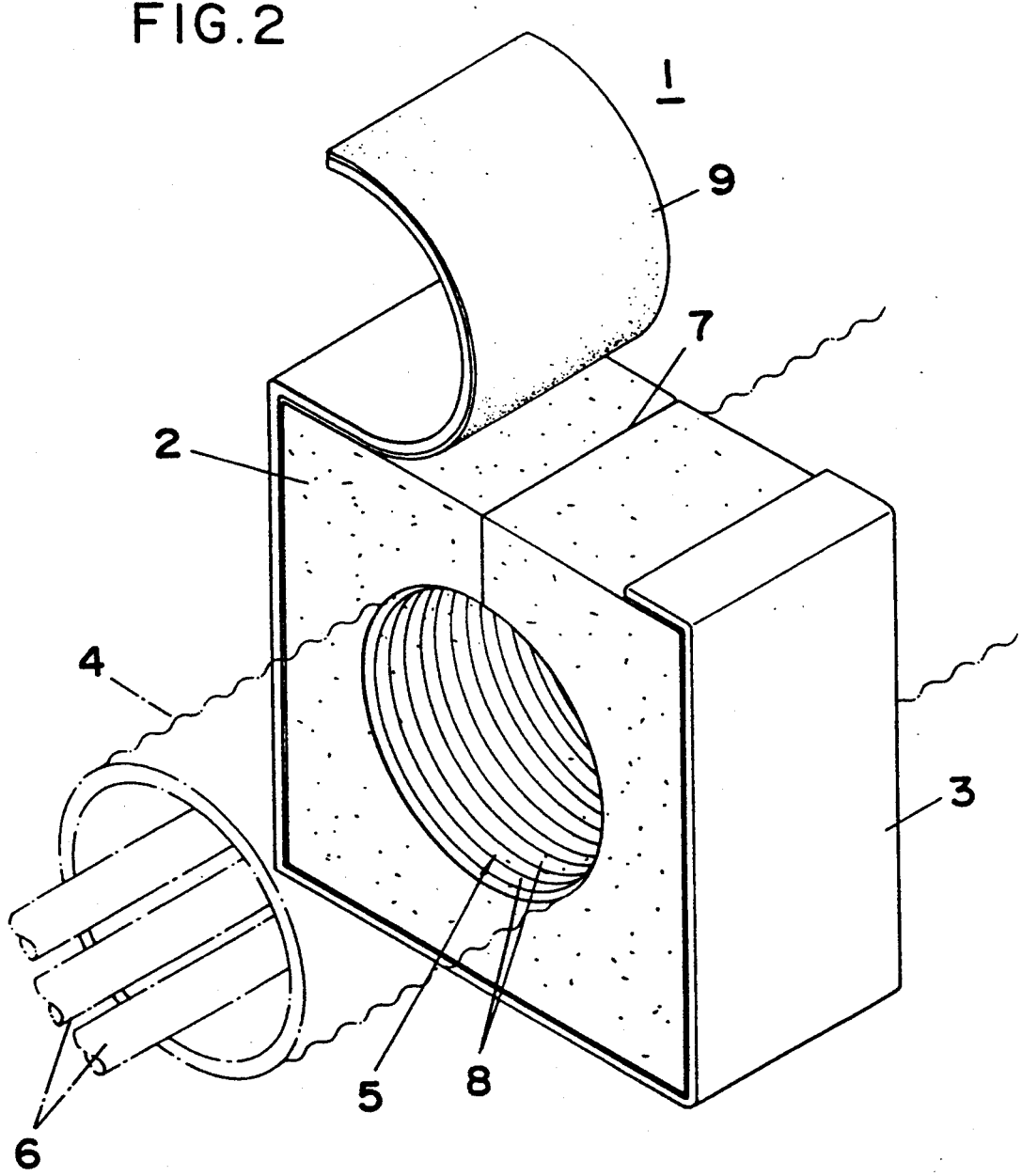
FIG. 2 is a partly-broken perspective view showing a duct laying fixture in detail.

Referring to the drawings particularly FIG. 2, the duct laying fixture 1 includes a box shaped barrel 2, and a water-expansible sheet 3 which is stuck on the outer surface of the barrel 2. The barrel 2 is made of an elastic material such as foamed plastic or rubber, and it is centrally formed with a port 5 for mounting a bellows type cable duct 4. This barrel 2 has water-expansible powder mixed therein, and it swells when water is present. Numeral 6 designates cables which are passed inside the bellows type cable duct 4.

The barrel 2 is formed with a barrel spreading slit 7. After the barrel 2 is spread at the slit 7, it is attached to the bellows type cable duct 4 so as to embrace this duct. Herein, the inner surface of the barrel 2, that is, the peripheral surface of the duct mounting port 5 is formed with bellows-like ribs 8, which come into close contact with the outer peripheral surface of the be type cable duct 4, thereby to enhancing water tightness and duct mounting force. The rear surface of the sheet 3 is coated with a pressure-sensitive adhesive 9. By way of example, the fiber of a polyacrylate type polymer or the fiber of a copolymer produced from polyisobutylene and maleic anhydride is used as the water-expansible sheet 3.

Figure 1:
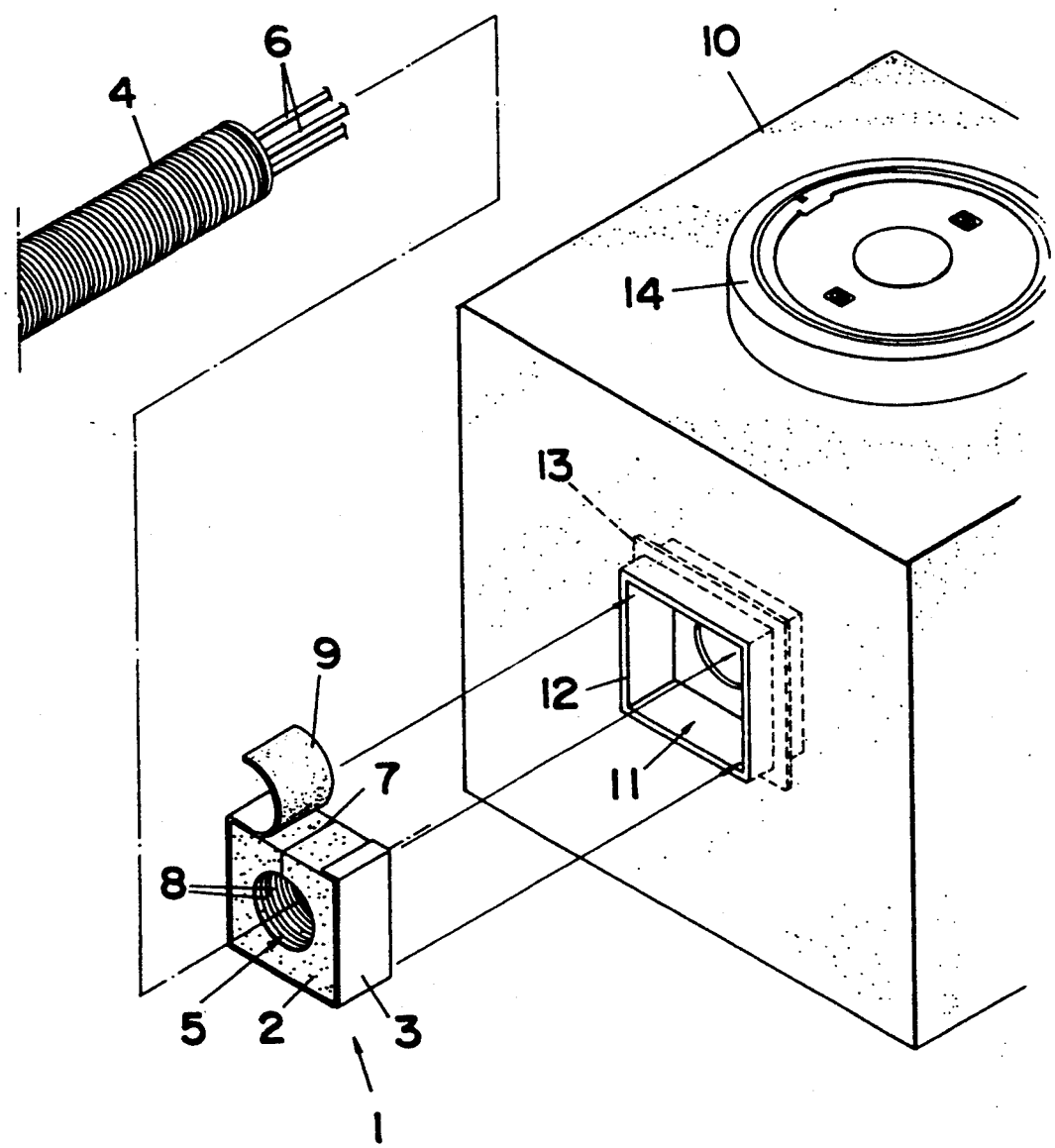
FIG. 1 is an exploded perspective view showing the whole scheme of duct laying.

Referring to FIG. 1, numeral 10 indicates a distributing box, the side wall of which is formed with an insertion hole 11 for receiving the duct laying fixture 1 therein. Shown at numeral 12 is an adapter which is fitted in the insertion hole 11. The adapter 12 is made of a synthetic resin into the shape of a box, and is formed with a water-blocking wall 13 at its outer peripheral part. The distributing box 10 is made of concrete, and is buried in the ground. A cover 14 is provided on the upper surface of the distributing box 10.

Next, a duct laying job will be described. The barrel 2 is spread at the slit 7 and is attached onto the bellows type cable duct 4, whereupon the sheet 3 is wound and stuck on the outer surface of the barrel 2. Subsequently, the duct laying fixture 1 through which the duct 4 is passed in this way is received into the insertion hole 11 of the distributing box 10. Thus, the fixture 1 can be easily assembled to lay the duct 4.

Figure 3:
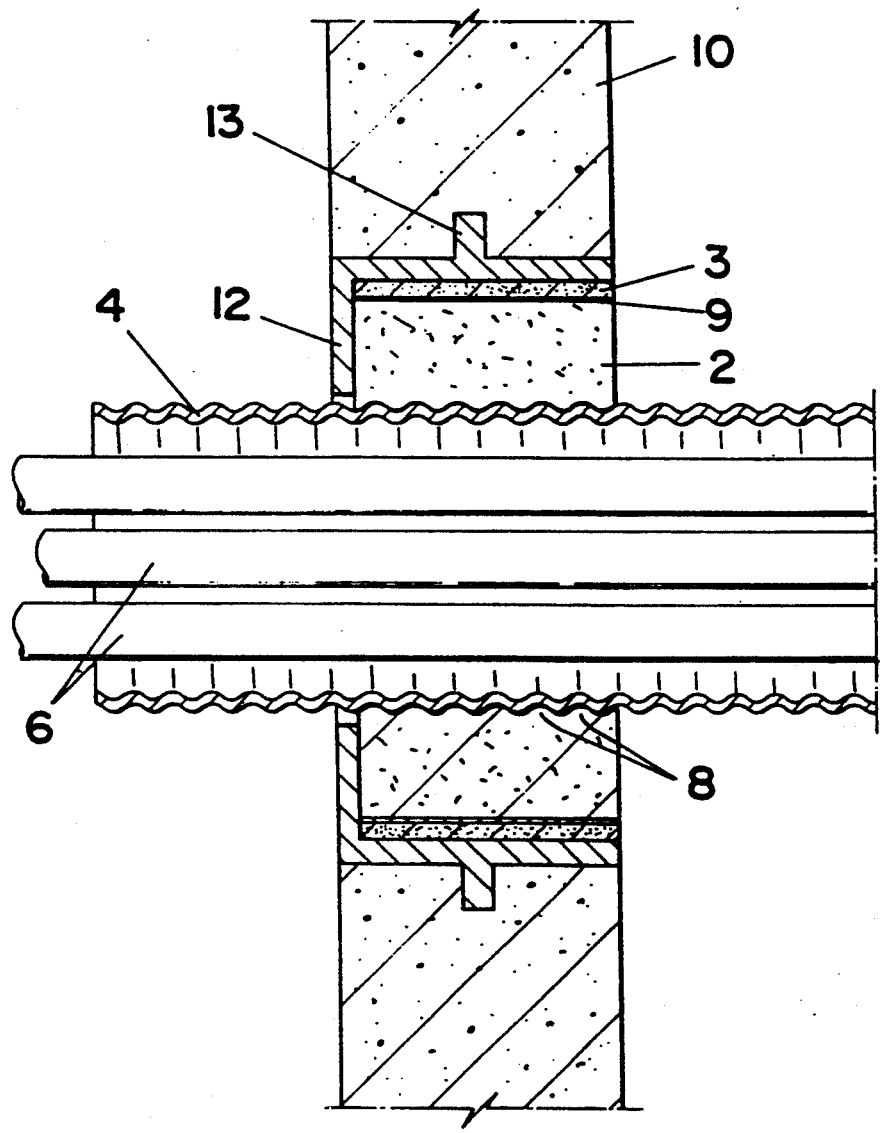
FIG. 3 is a vertical sectional view showing the assembled state of the duct laying fixture.

In the assembled state of the duct laying fixture 1 as shown in FIG. 3, the box-shaped barrel 2 lies in close contact with the inner surface of the adapter 12 and the outer surface of the cable duct 4 owing to its elasticity. Besides, underground water which is about to permeate the distributing box 10 from the abutting plane between the barrel 2 and the adapter 12 is absorbed by the sheet 3. In this regard, as the sheet 3 absorbs more water, it swells more and comes into close contact with the outer surface of the barrel 2 and the inner surface of the adapter 12 more intensely. Therefore, the duct laying fixture 1 blocks the water and can attain a satisfactory watertight effect. Moreover, since the barrel 2 is also expands in the presence of water, it swells more and comes into closer contact with the outer surface of the bellows type cable duct 4 with the absorption of the underground water. Accordingly, the watertight effect can be enhanced even more.

The use of the barrel 2 and the sheet 3 which expand in the presence of water permits the barrel 2 and the bellows type cable duct 4 to come into snug contact and to attain satisfactory watertightness in the presence of underground water even when the barrel 2 is loosely attached to the duct 4. Therefore, dispersions may well be involved in the dimensions of the barrel 2 and the execution of the duct laying work, which is very advantageous for the molding of the barrel 2 and the execution in a job site. Further, vibrations ascribable to an earthquake, vehicles passing on a road, etc. are absorbed by the barrel 2. Still further, since the bellows type cable duct 4 is elastically held firm by bellows means, it is prevented from falling off or being damaged.

As described above, according to the present invention, it is possible to provide a duct laying fixture which can efficiently and easily lay a bellows type cable duct in a job site and which is watertight and vibration resistant. In particular, the present invention employs water-expansible materials for a barrel and a sheet which constitute the fixture. Therefore, the invention brings forth the effect that, as the fixture absorbs underground water more, it increase the watertightness and a mounting force, thereby reliably blocking the water.

What is claimed is:

1. A duct laying fixture for a bellows type cable duct, comprising a box shaped barrel which is made of a water-expansible elastic material and which is attached to said bellows type cable duct so as to embrace said duct, and a water-expansible sheet which is stuck on an outer surface of said barrel; said barrel including a duct mounting port in which said bellows type cable duct is mounted, ribs which are formed on a peripheral wall surface of said duct mounting port and which come into close contact with an outer peripheral surface of said bellows type cable duct, and a barrel spreading slit which is formed so as to extend from one side surface of said barrel to said duct mounting port; wherein said sheet is stuck on said outer surface of said barrel after said duct has been passed through said port by spreading said barrel at said slit.

2. A duct laying fixture for said bellows type cable duct as defined in claim 1, wherein said material of said box-shaped barrel, is a member selected from the group consisting of foam plastic and rubber.

3. A duct laying fixture for said bellows type cable duct as defined in claim 2, wherein said material of said box-shaped barrel contains water-expansible powder mixed therein.

* * * * *